US012572785B2

(12) United States Patent
Maji et al.

(10) Patent No.: US 12,572,785 B2
(45) Date of Patent: Mar. 10, 2026

(54) METHODS AND HARDWARE FOR INTER-LAYER DATA FORMAT CONVERSION IN NEURAL NETWORKS

(71) Applicant: Arm Limited, Cambridge (GB)

(72) Inventors: Partha Prasun Maji, Cambridge (GB); Sangwon Ha, Cambridge (GB)

(73) Assignee: Arm Limited, Cambridge (GB)

( * ) Notice: Subject to any disclaimer, the term of this patent is extended or adjusted under 35 U.S.C. 154(b) by 915 days.

(21) Appl. No.: 17/860,439

(22) Filed: Jul. 8, 2022

(65) Prior Publication Data
US 2024/0013051 A1 Jan. 11, 2024

(51) Int. Cl.
*G06N 3/04* (2023.01)
*G06N 3/0495* (2023.01)
(52) U.S. Cl.
CPC ................................. *G06N 3/0495* (2023.01)
(58) Field of Classification Search
CPC ...................................................... G06N 3/0495
See application file for complete search history.

(56) References Cited

U.S. PATENT DOCUMENTS

| | | | |
|---|---|---|---|
| 2022/0284260 A1 * | 9/2022 | Patel | G06N 3/0495 |
| 2023/0058500 A1 * | 2/2023 | Bijalwan | G06V 10/776 |

OTHER PUBLICATIONS

Liu, Zhenhua, et al. "Instance-aware dynamic neural network quantization." Proceedings of the IEEE/CVF conference on computer vision and pattern recognition. 2022. (Year: 2022).*

* cited by examiner

*Primary Examiner* — Hal Schnee
(74) *Attorney, Agent, or Firm* — NIXON & VANDERHYE P.C.

(57) ABSTRACT
The present disclosure relates to a method of inter-layer format conversion for a neural network, the neural network comprising at least two computation layers including a first layer to process first data in a first data format and a second layer to process second data in a second data format, the method comprising: extracting data statistics from data output by the first layer, said data statistics being representative of the data output by the first layer; determining one or more conversion parameters based on the extracted data statistics and the second data format; and generating the second data for the second layer by modifying said data output by the first layer using the one or more conversion parameters.

19 Claims, 3 Drawing Sheets

300

S310

SEM receives output of layer *n*

S320

SEM extracts statistics from output of layer n

S330

FDM receives statistics from SEM

S340

FDM determines conversion parameters based on target format using statistics

S350

MM updates conversion parameters and reformats output of layer *n*

METHODS AND HARDWARE FOR INTER-LAYER DATA FORMAT CONVERSION IN NEURAL NETWORKS

FIELD OF THE INVENTION

The present technology relates to multi-layer artificial neural networks in which one layer of a neural network processes data in a data format different from another layer in the neural network. In particular, the present technology relates to inter-layer data format conversion in neural networks.

BACKGROUND

In many machine learning applications, the performance of neural networks is limited by the latency, energy, and model size. One possible way of improving hardware efficiency is to quantize the weights and activations to a lower precision.

A conventional approach to quantization is to use the same number of bits for all layers of a neural network. However, different layers have different redundancy and may behave differently on the hardware depending on individual computation or memory constraints. In some neural network hardware accelerators, one layer may process input in a data format different from the next layer (e.g. accelerators running in a precision lower that FP32 such as FP8, FP16 and/or INT8). As such, this approach could lead to varying and unpredictable accuracy for different layers.

In another approach, there are deep neural network hardware accelerators that can support multiple number formats, including but not limited to bit precisions and number systems, amongst layers to further improve computation efficiency. This leads to the need to covert the output of one layer from one data format to a different data format to be input to the next layer. Such inter-layer data format conversion is not trivial. Currently, to perform such conversion generally requires a human expert to manually determine the necessary data format parameters of each layer, taking into account accuracy, latency, energy, and model size, etc., before devising a suitable conversion for each layer, which is time-consuming and sub-optimal.

It is therefore desirable to improve methods of quantization and inter-layer data format conversion.

BRIEF DESCRIPTION OF THE DRAWINGS

Embodiments will now be described, with reference to the accompanying drawings, in which.

DETAILED DESCRIPTION

Figure 1:
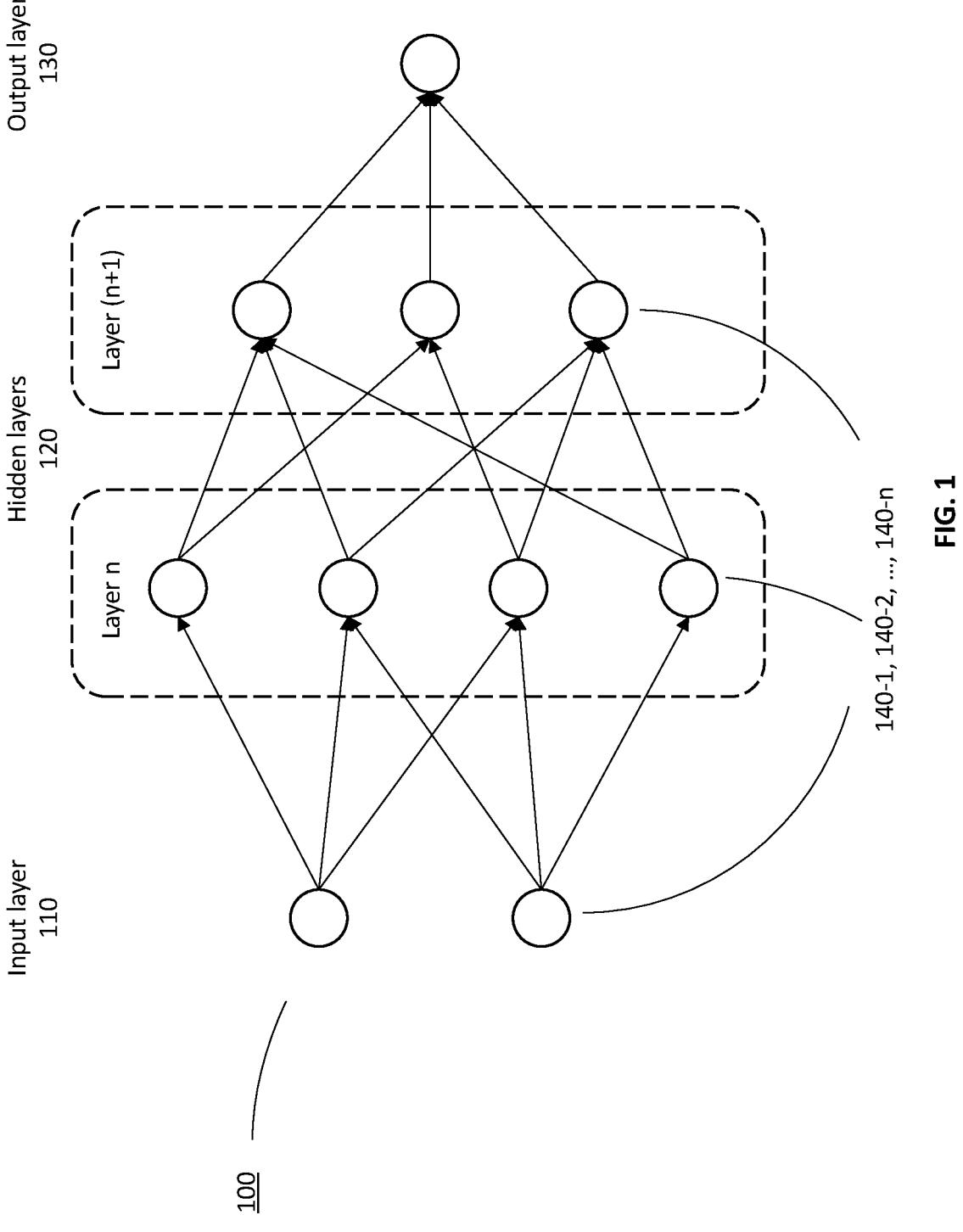
FIG. 1 shows schematically exemplary architecture of a neural network.

An aspect of the present technology provides a method of inter-layer format conversion for a neural network, the neural network comprising at least two computation layers including a first layer to process first data in a first data format and a second layer to process second data in a second data format, the method comprising: extracting data statistics from data output by the first layer, said data statistics being representative of the data output by the first layer;

determining one or more conversion parameters based on the extracted data statistics and the second data format; and generating the second data for the second layer by modifying said data output by the first layer using the one or more conversion parameters.

According to embodiments of the present technology, inter-layer format conversion to convert data output by the first layer from the first data format to the second data format for processing by the second layer is performed using conversion parameters determined based on data statistics extracted from the data output by the first layer and the target (second) data format of the second layer. Through embodiments of the present technology, data format conversion between layers of a neural network may be executed with reduced or no human intervention. As such, in applications such as quantization of a neural network, it is possible to quantize a neural network with improved efficiency, where the outcome of quantization has a higher predictability in terms of accuracy and latency.

In another aspect of the present technology, embodiments of the inter-layer format conversion method may be implemented for a forward path of neural network training in quantization-aware training. Thus, the present aspect provides a method of quantization-aware training of a neural network, the neural network comprising at least two computation layers including a first layer to process first data in a first data format and a second layer to process second data in a second data format, the method comprising: extracting data statistics from data output by the first layer, said data statistics being representative of the data output by the first layer; determining one or more conversion parameters based on the extracted data statistics and the second data format; and generating the second data for the second layer by modifying said data output by the first layer using the one or more conversion parameters.

In some embodiments, the method may further comprise obtaining one or more format parameters representative of the second data format, wherein determining one or more conversion parameters is performed using the one or more format parameters.

In some embodiments, said one or more format parameters may comprise one or more of: a bit size, a precision, fixed point, floating point or quantization parameters.

Embodiments of the present technology may be implemented for any form of data format conversions. In some embodiments, the first data format may be a first number format and the second data format may be a second number format, such that a data format conversion comprises a conversion of number format.

There are many possible and suitable number format that can be implemented in the context of the present technology. In some embodiments, the first number format or the second number format may comprise an integer format, a floating point format, or a block floating point format.

In some embodiments, modifying said data output by the first layer using the one or more conversion parameters may comprise converting said data output by the first layer from a first precision to a second precision.

In some embodiments, modifying said data output by the first layer using the one or more conversion parameters may comprise converting a size of said data output by the first layer from a first number of bits to a second number of bits.

The data statistics extracted from the data output by the first layer may be any one or more moments that are representative of the output data. In some embodiments, said data statistics may comprise one or more of: a mean, a variance, a minimum, a maximum, or a combination thereof.

In some embodiments, said one or more conversion parameters may comprise one or more of: an exponent of said data output by the first layer, a scale factor between said first data and said second data, a zero point, an indication of linearity or non-linearity, an indication of exponent bias, or a combination thereof.

In some embodiments, the method may further comprise generating subsequent second data for the second layer by modifying subsequent data output by the first layer using at least one of the one or more conversion parameters. For example, when inter-layer format conversion involves a change in scale, the scale factor may in some cases be used for the conversion of more than one set of output from the same layer.

Another aspect of the present technology provides hardware for inter-layer format conversion for a neural network, the neural network comprising at least two computation layers including a first layer to process first data in a first data format and a second layer to process second data in a second data format, the hardware comprising: a statistics extraction module comprising circuitry configured for extracting data statistics from data output by the first layer, said data statistics being representative of the data output by the first layer; a format deduction module comprising circuitry configured for determining one or more conversion parameters based on the extracted data statistics and the second data format; and a modification module comprising circuitry configured for generating the second data for the second layer by modifying said data output by the first layer using the one or more conversion parameters.

In some embodiments, said format deduction module may be further configured to obtain one or more format parameters representative of the second data format, and said format deduction module may be configured to determine said one or more conversion parameters using the one or more format parameters. Optionally, said one or more format parameters may comprise one or more of: a bit size, a precision, fixed point, floating point.

In some embodiments, the first data format may be a first number format and the second data format may be a second number format. Optionally, said modification module may modify said data output by the first layer using the one or more conversion parameters by converting said data output by the first layer from a first precision to a second precision.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

Overview of Neural Networks (NN)

Neural networks are non-linear statistical data modeling or decision-making tools that can be used to model complex relationships between inputs and outputs (without actually knowing the relationships) or to find patterns in data. An exemplary artificial neural network (NN) is schematically shown in FIG. 1.

Generally speaking, a given NN, e.g. NN 100, consists of an interconnected group of artificial "neurons" 140-1, 140-2, . . . , 140-n, which process information using a connectionist approach to computation. Inputs are fed to neurons in an input layer 110, processed through one or more hidden layers 120 (layer n and layer n+1), then the result of the computation is output to an output layer 130.

NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation giving little importance to what happens inside the "box".

NNs are commonly used in many such situations where an appropriate output based on a given input is important, but exactly how that output is derived is of lesser importance or is unimportant. For example, NNs are commonly used to optimize the distribution of web-traffic between servers and in data processing, including filtering, clustering, signal separation, compression, vector generation and the like.

In some non-limiting embodiments of the present technology, the NN can be implemented as a deep neural network, consisting of at least two layers. It should be understood that NNs can be classified into various classes of NNs. Below are a few non-limiting example classes of NNs.

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Convolutional Neural Network (CNN)

CNNs are also known as shift invariant or space invariant artificial neural networks (SIANN), based on the shared-weight architecture of the convolution kernels or filters that slide along input features and provide translation equivariant responses known as feature maps. They are most commonly applied to analyze visual imagery and have applications in image and video recognition, recommender systems, image classification, image segmentation, medical image analysis, natural language processing, brain-computer interfaces, and financial time series.

CNNs use relatively little pre-processing compared to other image classification algorithms and learn to optimize the filters (or kernels) through automated learning.

Figure 2:
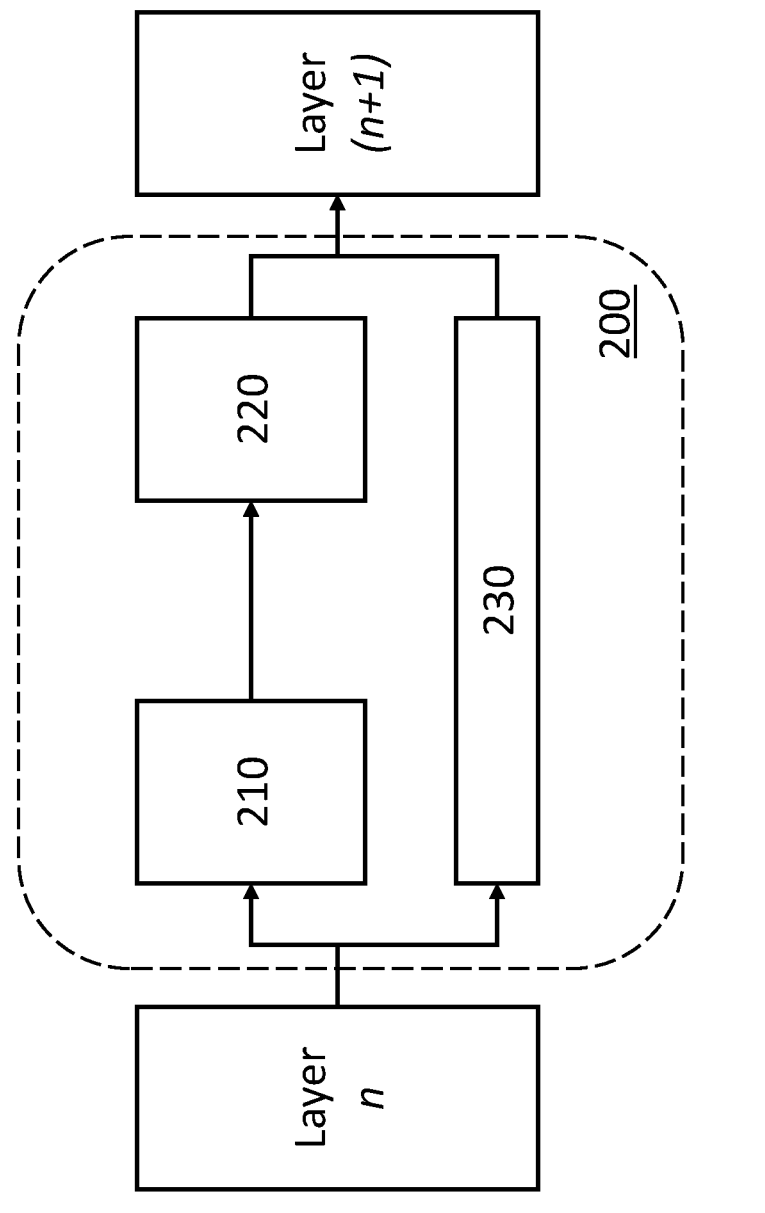
FIG. 2 shows schematically exemplary architecture of inter-layer format conversion.

Turning now to an embodiment of the present technology. FIG. 2 schematically shows an exemplary architecture inter-layer format conversion system (implemented as software or hardware) according to the present embodiment. The present embodiment may be applied to any artificial neural network (e.g. neural network 100), in which at least one computation layer of the neural network processes data in a data format that is different from one or more other layer(s) of the neural network, for example when different precisions are used in different layers. In the present embodiment, it is assumed, for illustration only, that layer n of the neural network 100 processes data in a data format different from layer (n+1).

The inter-layer format conversion system 200 comprises a statistics extraction module 210 configured to extract one or more sets of statistics from the data output by layer n of neural network 100, a format deduction module 220 configured to use the statistics received from the statistics extraction module 210 to derive one or more conversion parameters for the data format of layer (n+1), and a modification module 230 configured to use the conversion parameters derived by the format deduction module 220 to modify the data output by layer n to convert the output of layer n from the data format of layer n (first data format) to the data format of layer (n+1) (second data format).

In particular, the statistics extraction module 210 extracts statistics such as mean, variance, minimum, maximum, etc. and other moments from the output of layer n. For example, the statistics extraction module 210 may determine that the minimum of layer n is −127 and the maximum is 128. Then, the format deduction module 220 derive one or more suitable, preferably optimal, conversion parameters such as an exponent and a scale factor to be used to convert the output from layer n to input for layer (n+1), based on the statistics received from the statistics extraction module 210 and the format of layer (n+1). For example, based on the data format of layer (n+1), the format deduction module 220 may deduce that the minimum of layer (n+1) is −255 and the maximum is 256, then using the statistics extracted from the output of layer n, the format deduction module 220 derive an exponent from the output of layer n and a scale factor of 2. The output of layer n and the conversion parameters derived by the format deduction module 220 are then fed to the modification module 230, which modifies the output of layer n using the conversion parameters to generate input for layer (n+1) in the data format of layer (n+1).

In the example above, the present embodiment is implemented on two computation layers of a neural network that process data in two different number formats. However, it would be clear to a skilled reader that the present embodiment can be implemented to convert or modify to and from any data format used by any artificial neural networks.

When the present embodiment is a software implementation, the various modules represent software modules each comprising machine-readable (software) code which, when executed by a processor, causes the processor to perform the function of each module.

When the present embodiment is a hardware implementation, the various modules represent hardware modules each comprising circuitry arranged and configured to perform the function of each module.

Figure 3:
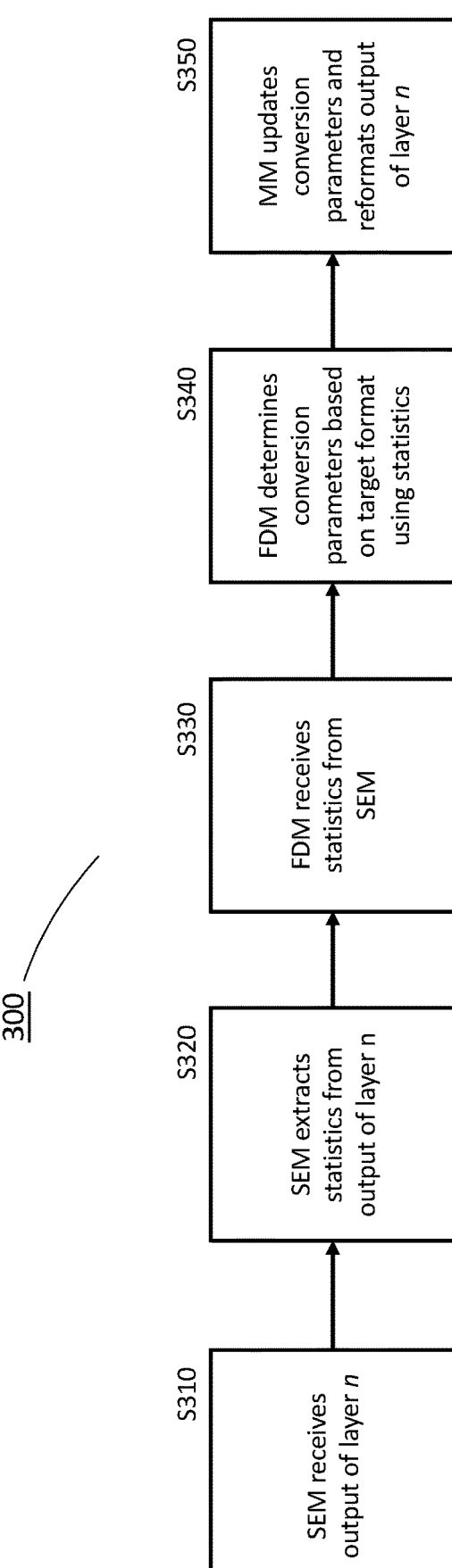
FIG. 3 shows an exemplary method of inter-layer format conversion.

FIG. 3 shows an exemplary method 300 of inter-layer format conversion according to an embodiment of the present technology. For illustration, the present embodiment is implemented on the exemplary neural network 100 using the exemplary system 200.

The method 300 begins when data is output from layer n of the neural network 100. At S310, the statistics extraction module 210 receives the output from layer n, then, at S320, the statistics extraction module 210 extracts statistics from the output of layer n.

At S330, the format deduction module 220 receives the statistics extracted from the output of layer n, then, at S340, the format deduction module 220 determines or derives one or more conversion parameters to be used to optimally modify the output of layer n, based on the extracted statistics and the formal of layer (n+1).

The determined one or more conversion parameters (e.g. exponent and scale factor) are then updated by the modification module 230 at S350, and used to modify the output of layer n to convert the output of layer to a data format that can be processed by layer (n+1). The modified output data from layer n is then input to layer (n+1).

In some embodiments, inter-layer format conversion such as described above is performed each time data is output from layer n to and all conversion parameters are updated each time.

In an alternative embodiment, instead of updating every conversion parameter each time data is output from layer n, one or more conversion parameters may be preserved (without being determined again and updated) and used for modifying output from layer n more than once. In doing so, processing resource and time requirements are reduced. For example, in the example used above, the scale factor used for converting from the data format of layer n to the data format of layer (n+1) is the same for all data output from layer n. Thus, once determined, some conversion parameters derived by the format deduction module 220 such as the scale factor may be preserved while other conversion parameters are updated by the modification module 230 when processing subsequent output from layer n.

Techniques describe herein enable a higher degree of automation (e.g. during inference and/or during training) in a neural network with layers that process data in different data format, requiring little or no manual input from experts beyond the initial accelerator setting stage, through the determination or derivation of conversion parameter(s) based on statistics extracted from data output from a layer. As such, techniques described herein reduce the time required for inter-layer format conversion (e.g. for quantization of a neural network) and improve consistency of the outcome of such conversions. In the case of neural network quantization, it is important that inter-layer format conversions and calibrations from one data format to another are performed optimally in order to minimize the overall quantization-induced task loss in respect of activations. The present approach enables such conversions and calibrations to be performed with consistency, thus providing a degree of predictability to the accuracy of the outcome and computing resource requirements.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A method of operation of a neural network hardware accelerator, the method comprising:

executing a neural network on the hardware accelerator, the neural network comprising at least two computation layers including a first layer to process first data in a first data format and a second layer to process second data in a second data format, the second data format differing from the first data format;

extracting, by the hardware accelerator, data statistics from data output by the first layer, said data statistics being representative of the data output by the first layer;

determining, by the hardware accelerator, one or more conversion parameters based on the extracted data statistics and the second data format;

generating, by the hardware accelerator, the second data for the second layer by modifying said data output by the first layer using the one or more conversion parameters; and providing, by the hardware accelerator, the generated second data to the second layer for processing.

2. The method of claim 1, further comprising obtaining, by the hardware accelerator, one or more format parameters representative of the second data format, wherein determining one or more conversion parameters is performed using the one or more format parameters.

3. The method of claim 2, wherein said one or more format parameters comprises one or more of: a bit size, a precision, fixed point, floating point.

4. The method of claim 1, wherein the first data format is a first number format and the second data format is a second number format.

5. The method of claim 4, wherein the first number format or the second number format comprises an integer format, a floating point format, or a block floating point format.

6. The method of claim 4, wherein modifying said data output by the first layer using the one or more conversion parameters comprises converting said data output by the first layer from a first precision to a second precision.

7. The method of claim 4, wherein modifying said data output by the first layer using the one or more conversion parameters comprises converting a size of said data output by the first layer from a first number of bits to a second number of bits.

8. The method of claim 1, wherein said data statistics comprises one or more of: a mean, a variance, a minimum, a maximum, or a combination thereof.

9. The method of claim 1, wherein said one or more conversion parameters comprise one or more of: an exponent of said data output by the first layer, a scale factor between said first data and said second data, a zero point, an indication of linearity or non-linearity, an indication of exponent bias, or a combination thereof.

10. The method of claim 1, further comprising generating, by the hardware accelerator, subsequent second data for the second layer by modifying subsequent data output by the first layer using at least one of the one or more conversion parameters.

11. A non-transitory computer-readable medium comprising machine-readable code which, when executed by a processor of a neural network hardware accelerator, causes the processor to perform a method comprising:

executing a neural network, the neural network comprising at least two computation layers including a first layer to process first data in a first data format and a second layer to process second data in a second data format, the second data format differing from the first data format;

extracting data statistics from data output by the first layer, said data statistics being representative of the data output by the first layer;

determining one or more conversion parameters based on the extracted data statistics and the second data format;

generating the second data for the second layer by modifying said data output by the first layer using the one or more conversion parameters; and providing the generated second data to the second layer for processing.

12. Hardware for executing a neural network, the neural network comprising at least two computation layers including a first layer to process first data in a first data format and a second layer to process second data in a second data format, the second data format differing from the first data format, the hardware further comprising:

statistics extraction circuitry configured for extracting data statistics from data output by the first layer, said data statistics being representative of the data output by the first layer;

format deduction circuitry configured for determining one or more conversion parameters based on the extracted data statistics and the second data format; and modification circuitry configured for generating the second data for the second layer by modifying said data output by the first layer using the one or more conversion parameters and for providing the generated second data to the second layer for processing.

13. The hardware of claim 12, wherein said format deduction circuitry is further configured to obtain one or more format parameters representative of the second data format, and said format deduction module is configured to determine said one or more conversion parameters using the one or more format parameters.

14. The hardware of claim 13, wherein said one or more format parameters comprises one or more of: a bit size, a precision, fixed point, floating point.

15. The hardware of claim 12, wherein the first data format is a first number format and the second data format is a second number format.

16. The hardware of claim 15, wherein said modification module modifies said data output by the first layer using the one or more conversion parameters by converting said data output by the first layer from a first precision to a second precision.

17. The hardware of claim 12, wherein said data statistics comprises one or more of: a mean, a variance, a minimum, a maximum, or a combination thereof.

18. The hardware of claim 12, wherein said one or more conversion parameters comprise one or more of: an exponent of said data output by the first layer, a scale factor between said first data and said second data, or a combination thereof.

19. A method of quantization-aware training of a neural network executing on a hardware accelerator, the neural network comprising at least two computation layers including a first layer to process first data in a first data format and a second layer to process second data in a second data format, the second data format differing from the first data format, the method comprising:

extracting, by the hardware accelerator, data statistics from data output by the first layer, said data statistics being representative of the data output by the first layer;

determining, by the hardware accelerator, one or more conversion parameters based on the extracted data statistics and the second data format;

generating, by the hardware accelerator, the second data for the second layer by modifying said data output by the first layer using the one or more conversion parameters; and providing, by the hardware accelerator, the generated second data to the second layer for processing.

\* \* \* \* \*